US009124641B2

(12) United States Patent
Baskaran

(10) Patent No.: US 9,124,641 B2
(45) Date of Patent: Sep. 1, 2015

(54) SYSTEM AND METHOD FOR SECURING THE DATA AND INFORMATION TRANSMITTED AS EMAIL ATTACHMENTS

(71) Applicant: Prakash Baskaran, Ashburn, VA (US)

(72) Inventor: Prakash Baskaran, Ashburn, VA (US)

(73) Assignee: PRAKASH BASKARAN, Ashbuurn ( * ) Notice: Subject to any disclaimer, the term of this patent is extended or adjusted under 35 U.S.C. 154(b) by 0 days.

(21) Appl. No.: 14/093,402

(22) Filed: Nov. 29, 2013

(65) Prior Publication Data

US 2015/0156220 A1 Jun. 4, 2015

Related U.S. Application Data

(63) Continuation of application No. 13/689,847, filed on Nov. 30, 2012, now Pat. No. 8,806,200.

(51) Int. Cl.
*H04L 29/06* (2006.01)

(52) U.S. Cl.
CPC .......... *H04L 63/205* (2013.01); *H04L 63/0838* (2013.01)

(58) Field of Classification Search
CPC ............ H04L 63/0815; H04L 63/0838; H04L 63/0853; H04L 63/0471; H04L 63/0464; G06F 21/40; G06Q 20/42
USPC ................................. 726/2, 3, 5, 6
See application file for complete search history.

(56) References Cited

U.S. PATENT DOCUMENTS

| | | | |
|---|---|---|---|
| 2003/0009694 A1* | 1/2003 | Wenocur et al. | 713/201 |
| 2003/0065942 A1* | 4/2003 | Lineman et al. | 713/201 |
| 2004/0133644 A1* | 7/2004 | Warren et al. | 709/206 |
| 2007/0124385 A1* | 5/2007 | Denny et al. | 709/206 |
| 2008/0098464 A1* | 4/2008 | Mizrah | 726/5 |
| 2009/0254572 A1* | 10/2009 | Redlich et al. | 707/10 |
| 2009/0292930 A1* | 11/2009 | Marano et al. | 713/189 |
| 2010/0146269 A1* | 6/2010 | Baskaran | 713/165 |
| 2011/0154456 A1* | 6/2011 | Machani | 726/6 |

* cited by examiner

*Primary Examiner* — Chau Le
*Assistant Examiner* — Don Zhao
(74) *Attorney, Agent, or Firm* — Barry Choobin; Patent360 LLC

(57) ABSTRACT

A system for securing data and information transmitted via entails is disclosed. The system includes a sender-side device from which an email including a first code is transmitted. The first code comprises instructions for manipulating server-side processing of the email. The system includes a filter module which determines whether the first code is present within the email, and subsequently transmits the email to a processing server in case if the first code is present within the email. The system includes a processing server which processes the email in accordance with the instructions specified in the first code and generates a first link, thereby enabling the email sender to access and modify the access policy for the email. The processing server further authenticates the intended recipient of the email via an OTP before enabling the intended recipient to access the parts of the email.

17 Claims, 6 Drawing Sheets

SYSTEM AND METHOD FOR SECURING THE DATA AND INFORMATION TRANSMITTED AS EMAIL ATTACHMENTS

CROSS REFERENCE TO RELATED APPLICATIONS

This application claims the priority of U.S. patent application Ser. No. 13/689,847 filed Nov. 30, 2012, the contents of which are incorporated entirely herein.

BACKGROUND

1. Technical Field

The present invention relates to the field of data security. Particularly, the present invention relates to a system and method for providing conditional and secured access to confidential information transmitted over a public communication network. More particularly, the present invention relates to a system and method for securing the files transmitted as email attachments over a public communication network.

2. Description of Related Art

Nowadays, there exists a perennial need for having a secured public communication channel that does not compromise the security associated with sensitive information. While access to Public communication channels such as internet is increasing every day through a myriad of devices, its use for communication beyond secure enterprise networks, through popular internet applications has become commonplace. Public communication channels such as internet, given the fact that they are more accessible are also more vulnerable to theft of information.

Email is one of the oldest and most popular methods of exchanging information over interne and has become more accessible these days through a multitude of devices that can connect to the internet. While this makes transmission and access to information easier, it also makes confidential or sensitive information more vulnerable. Given the fact that emails reach a recipient's inbox hopping over multiple message servers and can be accessed from multiple devices heightens the risk of sensitive information being compromised either in transit or when devices are in the wrong hands either due to accidental loss or intentional theft.

Though there are existing protocols and systems for protection of emails during transit such as SSL/TLS, they are not enough to ensure that emails and sensitive information sent via mails is accessed only by the intended recipients. There are some methods already in use such as Information Rights Management (IRM) that try to prevent unauthorized access to information. However, existing IRM based systems work well within an intranet such as an enterprise network, and do not possess the scalability and extensibility necessary for deployment across a vast public communication network. One of the major drawbacks associated with IRM based systems is that the implementation of an IRM based system is restricted to private networks, intranet and enterprise networks. Another drawback of existing IRM based systems is that the information corresponding to file access policies is clubbed with the information that the IRM based system intends to protect. Therefore, once a file is hacked, changing the usage access policies may not provide serious challenges for a proficient hacker. Moreover, existing IRM based systems provide fixed file access policies applicable typically to a group of well-known internal recipients and also cannot be altered as per the requirements at a later point of time after the content is out of the protective IRM system.

Another alternative to IRM systems that try to cover this gap are cryptographic systems such as PGP (Pretty Good Privacy) which make use of encryption keys. However, selecting and distributing multiple encryption keys amongst multiple intended recipients is one of the vexing issues associated of these systems. Moreover, if one encryption key is commonly used for encrypting the document(s) transmitted to multiple recipients, in the event that the encryption key is revealed to unauthorized user(s), the security of all the documents using the encryption key would be compromised. Another drawback associated to with the existing cryptographic systems is that they are complex and cumbersome in terms of management.

Moreover, an email and its parts (including the attachments) are difficult to protect and secure, subsequent to them reaching a recipient. The fact that email is ubiquitous and accessible from a multitude of electronic devices makes the sensitive information transmitted via email more vulnerable, in the event that the security of a device having access to sensitive emails is compromised. Further, there exists no other system/method that enables an email sender to secure/ protect the parts of the email, and enables the sender to manage the access rights corresponding to an email after the email has been transmitted to an intended recipient.

Therefore, there was felt a need for a system method that overcame the aforementioned drawbacks. Moreover, there was also felt a need for an uncomplicated and easy to manage system and method that provides for the files transmitted along with entails as attachments, over a public communication network to be protected, made accessible to only the authorized user and controllable or managable even at a later point of time.

OBJECTS

An object of the present invention is to provide a system and method that secures the data and information transmitted in the form of email messages.

Yet another object of the present invention is to provide a system and method that does not warrant usage of external cryptographic keys necessitating extraneous storage, transportation and management of the same, for securing the information sent via emails as a part of the email body and/or its attachments.

Still a further object of the present invention is to provide a system and method that obviates the need for utilization of key distribution centers and third party key managers.

Yet another object of the present invention is to provide a system and method that is easy to use and uncomplicated.

Yet another object of the present invention is to provide a system and method that can be integrated with existing email applications and email communication infrastructure.

One more object of the present invention is to provide a system and method that authenticates a recipient of an email before making the protected parts of an email, available to the recipient.

Another object of the present invention is to provide the Sender or Owner of an email, an opportunity to modify the access policies of the protected parts of an email including the pan specifying the intended recipients of the email, access rights and time validity of the protected parts thereof, after an email has already been transmitted from a sender-side device.

Another object of the present invention is to provide a system that enables an email sender to access the usage logs corresponding to the email and the parts thereof.

Another object of the present invention is to provide a system that integrates an OTP based authentication system with the conventional email transmission mechanism thereby providing an additional means of authentication for recipients of emails.

SUMMARY

The present disclosure envisages as computer implemented system for securing the data and information transmitted via emails. The system comprises a sender-side device executing a sender-side application. The sender-side application enables a sender to create an email having a plurality of parts. The sender-side application enables the sender to include a first code within one of the parts of the email. The first code comprises instructions for manipulating server-side processing of the email, on transfer of the email to a message server.

The system further includes a filter module which determines whether the first code is present within at least one part of the email. The filter module is configured to transmit the email to a processing server for father processing, only in the event the email contains the first code.

The system further includes a processing server which receives the email from the filter module and processes the sane in accordance with the instructions specified in the first code. The processing server generates at least one access policy corresponding to at least one part of the email.

The processing server comprises, inter-alia, a link creator configured to create a first link accessible to the sender of the email. The first link enables the sender to access and modify the access policy for the email. The processing server creates at least one second link corresponding to at least one part of the email, the second link providing the intended recipient with restricted access to at least the one part of the email.

The processing server comprises, inter-alia, a file manipulation engine configured to selectively encapsulate parts of the email into respective proprietary file wrappers, each of the proprietary file wrappers having a proprietary file format and a proprietary file extension.

The processing server comprises, inter-alia, a generator configured to generate a one-time password (OTP) subsequent to the intended recipient accessing the second link. The generator comprises a prompting module configured to prompt the intended recipient for his-email id.

The generator further comprises a comparator configured to compare the email-id provided by the intended recipient with the recipient-id specified by the sender. The comparator cooperates with a verification module configured to successfully validate the email id of the intended recipient in the event that the email-id provided by the intended recipient matches with the 'recipient email-id' entered by the sender. The generator further includes a transmitter configured to transmit the OTP to an OTP end-point accessible to the intended recipient subsequent to successful validation of the email-id provided by the intended recipient, wherein the OTP end-point identifiable from an identifier included in the first code. The processing server is further configured to provide the intended recipient access to the parts of the email in accordance with the access policy, only in the event that the intended recipient successfully reproduces the OTP previously transmitted by the transmitter within a predetermined time limit, the OTP authenticating the intended recipient, in the event that the recipient chooses to be authenticated via OTP. The processing server uses the OTP mechanism which is one of the possible options for authenticating an intended recipient of an email.

In accordance with the present invention, the system comprises a recipient-side device accessible to the intended recipient of the email, and capable of receiving the second link transmitted by the link creator.

In accordance with the present invention, the sender-side device and recipient-side device are computing devices capable of receiving and handling email messages, the computing devices being selected from the group of computing devices consisting of a desktop computer, a laptop computer, a tablet computer, a mobile phone, a smart phone, a satellite phone and a personal digital assistant (PDA).

In accordance with the present invention, the OTP end-point is selected from the group consisting of a validated email account, a mobile phone, a smart phone, a personal digital assistant, an OTP recipient device, and an electronic device implementing an OTP receiving application.

In accordance with the present invention, the first code comprises at least one tag entry and at least one keyword, the tag and keyword comprising at least one character selected from Unicode character set.

In accordance with the present invention, the first code further comprises an email address corresponding to an intended recipient and an identifier identifying the OTP end-point.

In accordance with the present invention, the plurality of parts of the email includes email headers, email body, inline parts and email attachment(s).

In accordance with the present invention, the link creator is configured to create a plurality of second links, each of the plurality of second links corresponding to the respective file wrappers, the file wrappers corresponding to respective parts of the email.

In accordance with the present invention, the processing server is further configured to gather, store and provide activity logs corresponding to the email, the activity logs comprising information corresponding to the activities performed upon the encapsulated parts of the email and the activity logs accessible to the email sender through the first link.

In accordance with the present invention, the first code further comprises instructions selected from the group consisting of instructions for encapsulating parts of the email into proprietary wrapper files, instructions for assigning, access permissions to the encapsulated parts of the email, instructions for specifying, valid recipients of the encapsulated parts, instructions corresponding to the time validity of encapsulated parts, and instructions for authenticating intended recipients of the parts.

In accordance with the present invention, the file manipulation engine is further configured to encrypt the email parts while encapsulating the parts of the email into respective file wrappers.

In accordance with the present invention, the processing server is further configured to cooperate with an application on the recipient-side device to decrypt the encrypted parts of the email or to decrypt the encrypted parts by itself post successful authentication of the intended recipient. In the event that the processing server decrypts the parts of the email, it stores the encrypted and decrypted parts of the email to enable the authenticated recipients to access the decrypted parts.

In accordance with the present invention, the processing server is configured to generate and store a plurality of access policies, each of the plurality of access policies corresponding to respective parts of the email, each of the access policies having a plurality of attributes including a list of allowed recipient address and access permissions thereof and validity period of the email parts thereof.

In accordance with the present invention, the link creator is further configured to enable the sender of the email to modify the email recipient addresses allowed to unwrap and use encapsulated parts of email. The link creator enables the sender to modify the access permissions associated with the encapsulated parts of the email, and the validity period associated with the email parts thereof. The link creator also enables the email sender to view the activity logs associated with encapsulated parts of the email.

The present invention envisages a computer implemented method for securing the data and information transmitted via emails. The method, in accordance with the present invention comprises the following computer implemented steps: executing a sender-side application on a sender-side device and enabling a sender to create an email having a plurality of parts; enabling the sender to include a first code within one of the parts of the email, the first code comprising instructions for manipulating server-side processing of the email; transmitting the email to a message server: accessing the email using a filter module and determining whether the first code is present within at least one part of the email, and transmitting the email for further processing, only in the event the email contains the first code; processing the email in accordance with the instructions specified in the first code, and generating at least one access policy corresponding to at least one part of the email; creating a first link and enabling the sender to modify at least the access policy for the email by accessing the first link; selectively encapsulating, parts of the email into respective proprietary file wrappers, each of the proprietary file wrappers having a proprietary file format and a proprietary file extension; creating at least one second link corresponding to at least one part of the email, and providing the intended recipient with restricted access to at least the part of the email, via the second link; generating a one-time password (OTP) subsequent to the intended recipient accessing the second link, the step of generating the one-time password comprising the following steps: prompting the intended recipient for his-email id; comparing the email-id provided by the intended recipient with the recipient-id specified by the sender; successfully verifying the authenticity of the intended recipient in the event that the email-id provided by the intended recipient matches with the recipient email-id entered by the sender; transmitting the OTP, post successful validation of the email-id of the intended recipient, to at least one OTP end-point of the intended recipient, the OTP end-point identifiable from an identifier included in the first code; providing the intended recipient with access to the parts of the email as per the access policy, only in the event that the intended recipient successfully reproduces the OTP previously transmitted by the transmitter, within a predetermined time limit, thereby authenticating, himself.

In accordance with the present invention, the step of enabling the sender to include a first code within one of the parts of the email further includes the following steps: enabling the sender to include a first code comprising instructions for assigning access permissions to the parts of the email; enabling the sender to include a first code comprising instructions for modifying the time validity of the parts of the email; and enabling the sender to include a first code comprising instructions for tracking the processing of the email and attachments thereof at the recipient side.

In accordance with the present invention, the step of processing the email in accordance with the instructions specified in the first code, further includes the steps of processing the email in accordance with instructions for assigning access permissions to the attachments of the email; processing the email in accordance with instructions for modifying the validity of the email and attachments thereof; and processing the email in accordance with instructions for tracking the processing of the email and attachments thereof at the recipient side.

In accordance with the present invention, the method further includes the step of transmitting the first link to the email-id associated with the sender of the email and transmitting the second link to the email-id of the intended recipients.

In accordance with the present invention, the step of processing the email in accordance with the instructions specified in the first code further includes the step of making, the activity logs accessible to the email sender through the first link.

In accordance with the present invention, the step of and generating at least one access policy corresponding to at least one part of the email further includes the following steps: enabling the sender of the email to modify the email recipients having access to the encapsulated pans of the email; enabling the sender to modify the access permissions corresponding to the parts of the email; enabling the sender to modify the validity period associated with the encapsulated email parts.

DETAILED DESCRIPTION

The present invention envisages a computer implemented system and method for securing the data and information transmitted as email attachments. The present invention envisages a system and method which provides for securing the data and information transmitted as email attachments, without using complicated public-key cryptography techniques. The present invention envisages a system and method that provides email attachments to be made available to an intended recipient only after authenticating the recipient with a one-time password (OTP).

Figure 1:
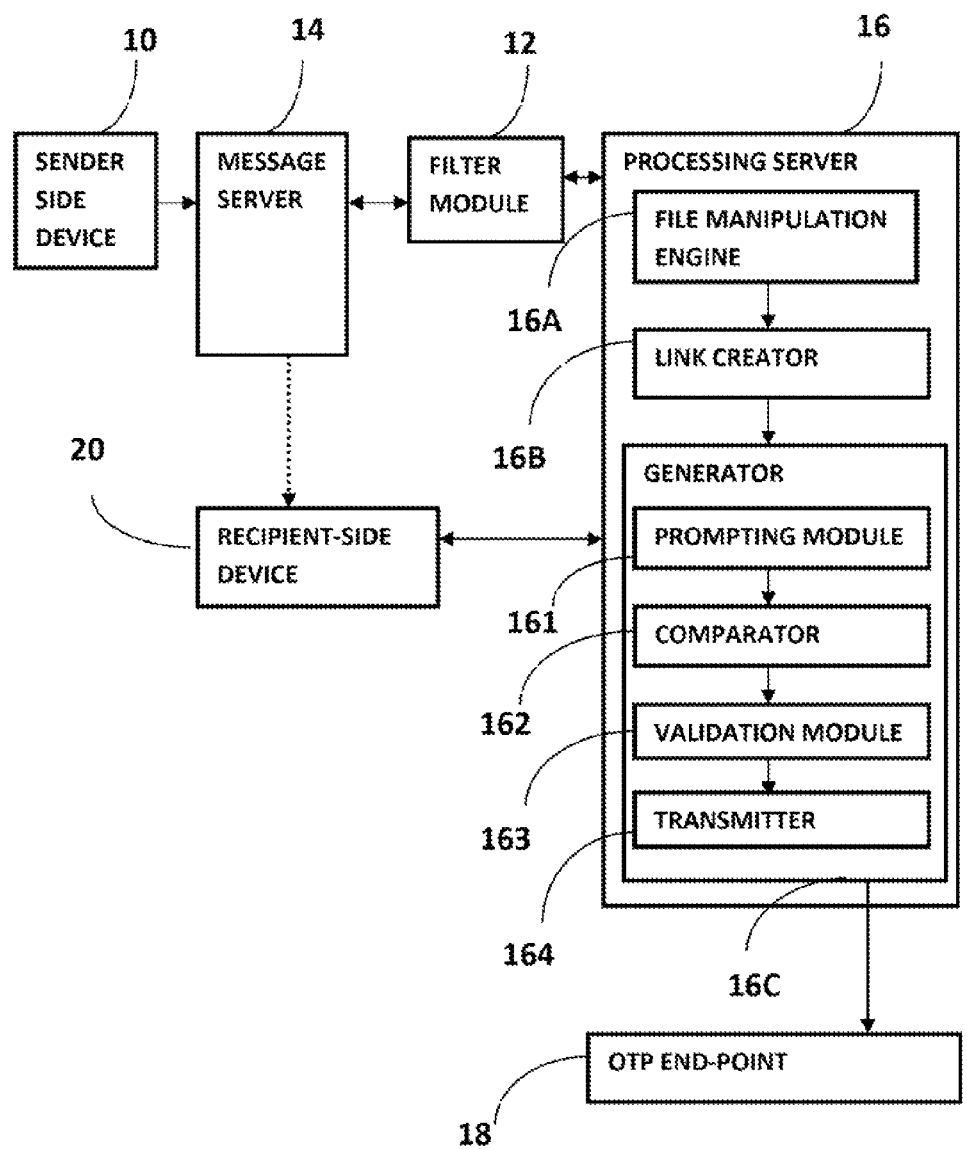
FIG. 1 is a system level block diagram illustrating the modules present in the system for securing the data and information transmitted as email attachments.
Figure 3:
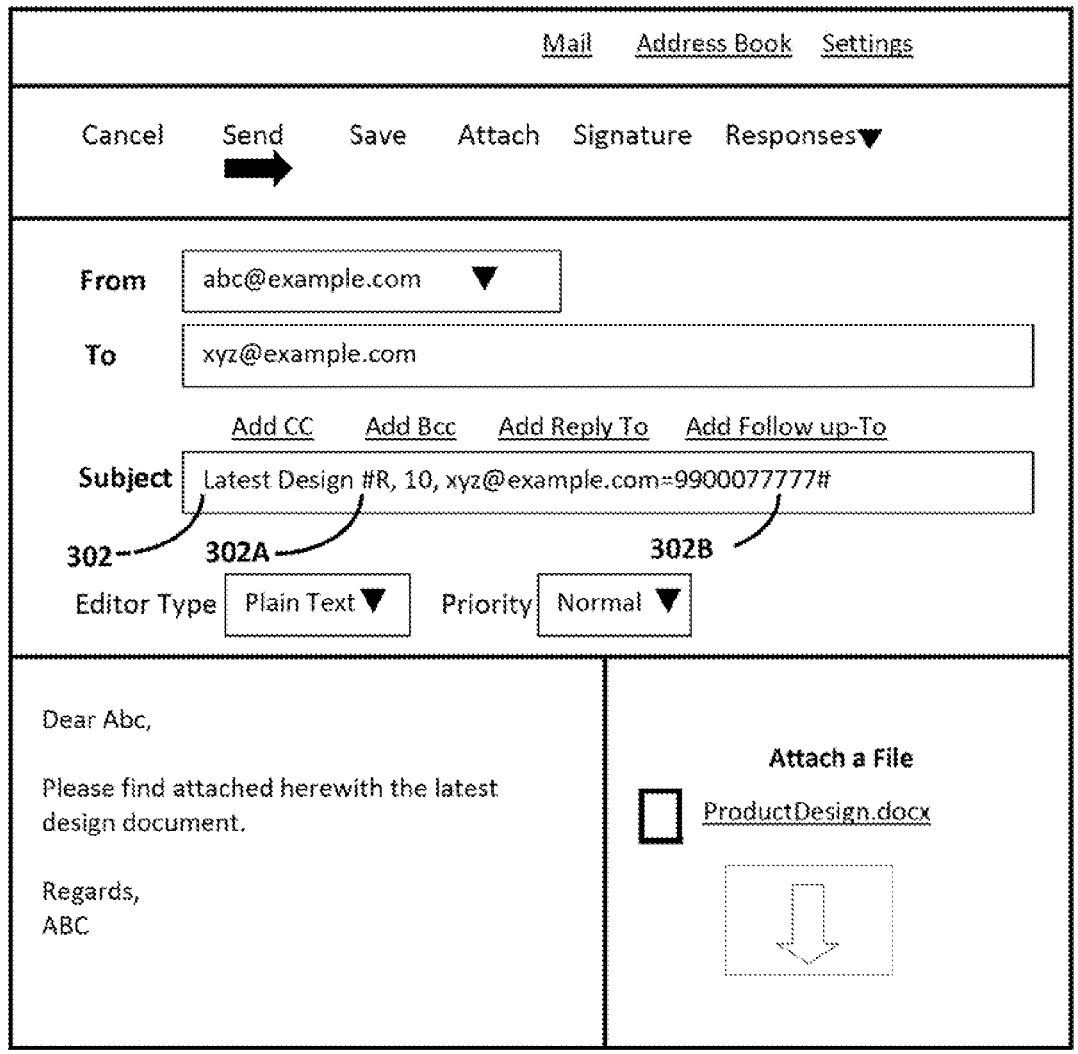
FIG. 3 is an exemplary screenshot representing a view of a user interface displaying the first code, the corresponding structure/format, in accordance with the present disclosure.

Referring to FIG. 1, there is shown a computer implemented system 100 for securing the data and information transmitted as email attachments. The system 100 includes a sender-side device denoted by reference numeral 10. The sender-side device 10 is a computing device capable of sending/receiving and managing email messages and is selected from a group consisting of a desktop computer, a laptop computer, a personal digital assistant (PDA), a smart phone and a mobile phone. The sender-side device 10 to executes a sender-side application, for example, an email application (Microsoft Outlook, Gmail, Yahoo Mail and the like). The sender-side device 10 enables a user (referred to as 'email sender' hereafter) to create an email using any of the aforementioned email clients. The email created by the sender typically comprises a plurality of parts, namely email header, email body, inline parts and email attachments. The email client application executed on the sender-side device 10 is configured to enable an email sender to include a first code (reference numeral 302 of FIG. 3) within the email. The part of the email which includes the first code is referred to as 'the first part' of the email, for the sake of explanation.

The first code (reference numeral 302 of FIG. 3), in accordance with the present invention includes at least one tag entry (reference numeral 302A of FIG. 3) and a keyword, with the keyword typically following the tag entry. The tag entry is, for example, a hash symbol (#) or a dollar symbol ($). The keyword is either a user-defined keyword or a system-specific keyword, and includes at least one character selected from the Unicode character set. For example, the word "ENCRYPT" is used as a keyword in the first code. The tag entry and keywords exemplified herein can be appropriately modified, and the scope of the present invention should be understood to cover all such modifications.

Further, the first code can be embedded within a part of the email. For example, the first code can be embedded in the 'subject-line' as shown in (reference numeral 302 of FIG. 3). Further, it is within the scope of the present invention to include the first code within any part of the email message. The first code embedded within the email determines the manner in which the email is to be handled at the server-side and also determines the accessibility and configuration aspects corresponding to the email.

In accordance with the present invention, an email comprising the first code (at least a tag entry, typically followed by a keyword) within the first part (for example, the subject-line) is transmitted from the sender-side device 10 to a message server 12. The message server 12 stores the emails received from the sender-side device 10 for further processing.

The system 100 envisaged by the present invention includes a filter module 14. The filter module 14 accesses the message server 10 in order to parse the entails received from the sender-side device 10. The filter module 14 parses each of the entails received by the message server 10, and determines whether the entails received by the message server 10 include the first code within the first part. However, it is within the scope of the present invention to enable the filter module to parse the email for the presence of first code in any part of the email. The 'first part' is explained with reference to the subject-line herein, only for the sake of explanation.

The filter module 14 transmits emails comprising the first code within the first portion, to a proprietary processing server denoted by reference numeral 16. The processing server 16 in accordance with the present invention processes the email in accordance with the instructions included in the first code. The first code comprises instructions selected from the group consisting of instructions for encapsulating parts of the email into proprietary wrapper files, instructions for assigning access permissions to the parts of the email instructions for specifying valid recipients of the encapsulated parts, instructions corresponding to the time validity of encapsulated pans, and instructions for authenticating intended recipients of the parts of the email.

As explained earlier, the first code (denoted by reference numeral 302 in FIG. 3) comprises instructions for manipulating the server-side processing of the email and also for controlling the access policies and configuration settings corresponding to the email and the parts thereof. For example, the first code could include the instruction '#ENCRYPT#'. This instruction, in accordance with the present invention, is interpreted by the filter module 14 as an instruction to the processing server 16 for encrypting the parts of the email and providing the intended recipient with read-only access to all the parts of the email. Further, the instruction '#ENCRYPT EXPIRE IN 30#' is interpreted by the filter module 14 as an instruction to the processing server 16 for encrypting the parts of the email and providing the intended recipient with read/write permissions, but only for a stipulated period of time i.e., 30 days. This instruction also enables the processing server 16 to handle the corresponding email parts in such a way that they expire after 30 days of sender sending the email. Further, the instruction '#ENCRYPT abc@abc.com 0123456789#' is understood by the filter module 14 as an instruction to the processing server 16 for transmitting the email to 'abc@abc.com' and transmitting OTP required to access the email to an OTP end-point device 18 identifiable via the identifier '0123456789'. Further, the instruction '#ENCRYPT 0123456789#' is understood by the filter module 14 as an instruction for the processing server 16 to consider the email addresses specified in the 'recipient address list' as the allowed set of recipients and transmit the OTP required to access the email to an OTP end-point device 18 identifiable via the identifier '0123456789'. Another example for identifying an OTP endpoint is provided in FIG. 3 wherein the portion of the first code (302 of FIG. 3) identifying the OTP client is represented by reference numeral 302B. However, the examples specified for the first code are only the purpose of exemplification and should not be construed as limiting the scope of the invention. Those having adequate skills in the art would readily appreciate that the first code can be appropriately modified based on the requirements corresponding to server-side processing of the email.

Figure 4:
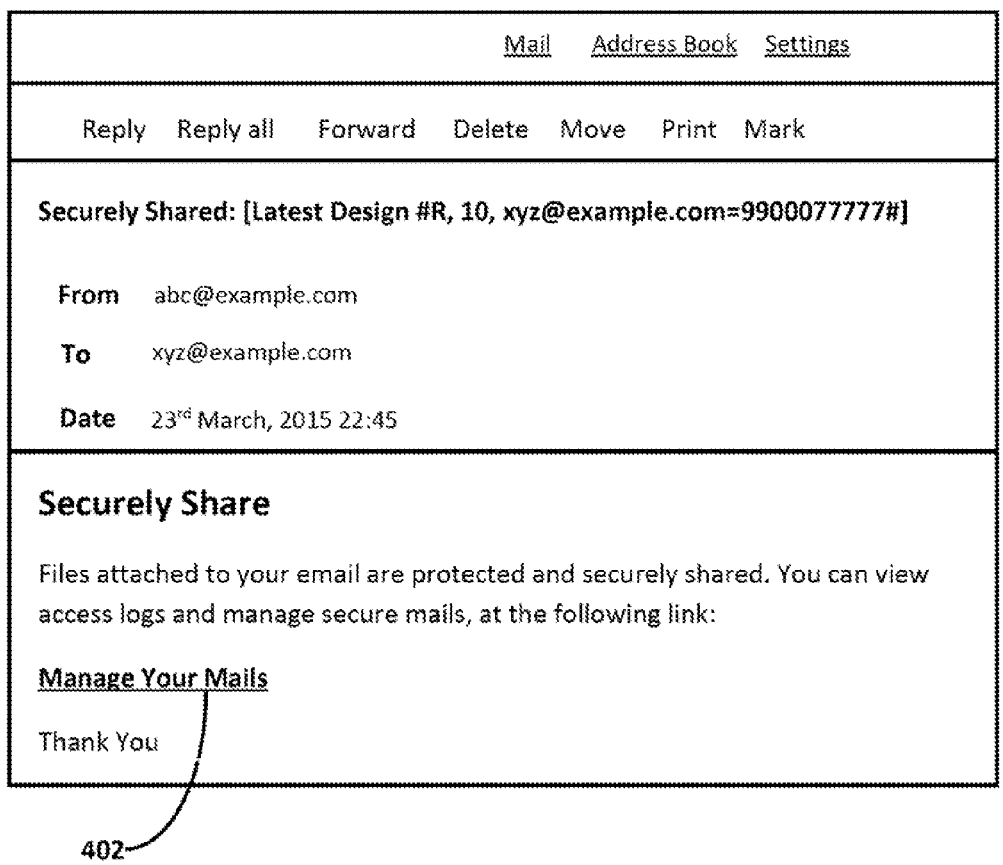
FIG. 4 is an exemplary screenshot representing a view of the user interface displaying a first link associated with a sender's email address, in accordance with the present disclosure.
Figure 6:
FIG. 6 is an exemplary screenshot representing a view of the user interface displaying a file access policy, in accordance with the present disclosure.

The processing server 16 further includes a link creator 16A configured to create a first link (denoted by reference numeral 402 in FIG. 4) accessible to the sender of the email via the sender-side device 10. The first link, created by the link creator 16A enables the email-sender to change the access policy (denoted by reference numeral 602 and 604 in FIG. 6) corresponding to the email. The first link created by the link creator 16A further enables the email sender to modify the email recipient addresses allowed to unwrap and use encapsulated parts of the email, enables the sender to modify the access permissions corresponding to the email, enables the sender to modify the validity period associated with the email parts thereof and to view the activity logs associated with encapsulated pans of the email.

The first link typically points to an accessible location typically situated on the processing, server 16 or in communication with the processing server 16 from any other location. The first link enables the email sender to access policy corresponding to the email, i.e., it enables the sender to add and delete the intended recipients from/to the recipient list. The first link also enables the email sender to change the access permissions associated with the parts of the email. However, it is within the scope of the present invention to inflict several other possible modifications to the email and attachments thereof, via a web-link enabling the sender to access the meta-data of the email at the server-end.

Figure 5:
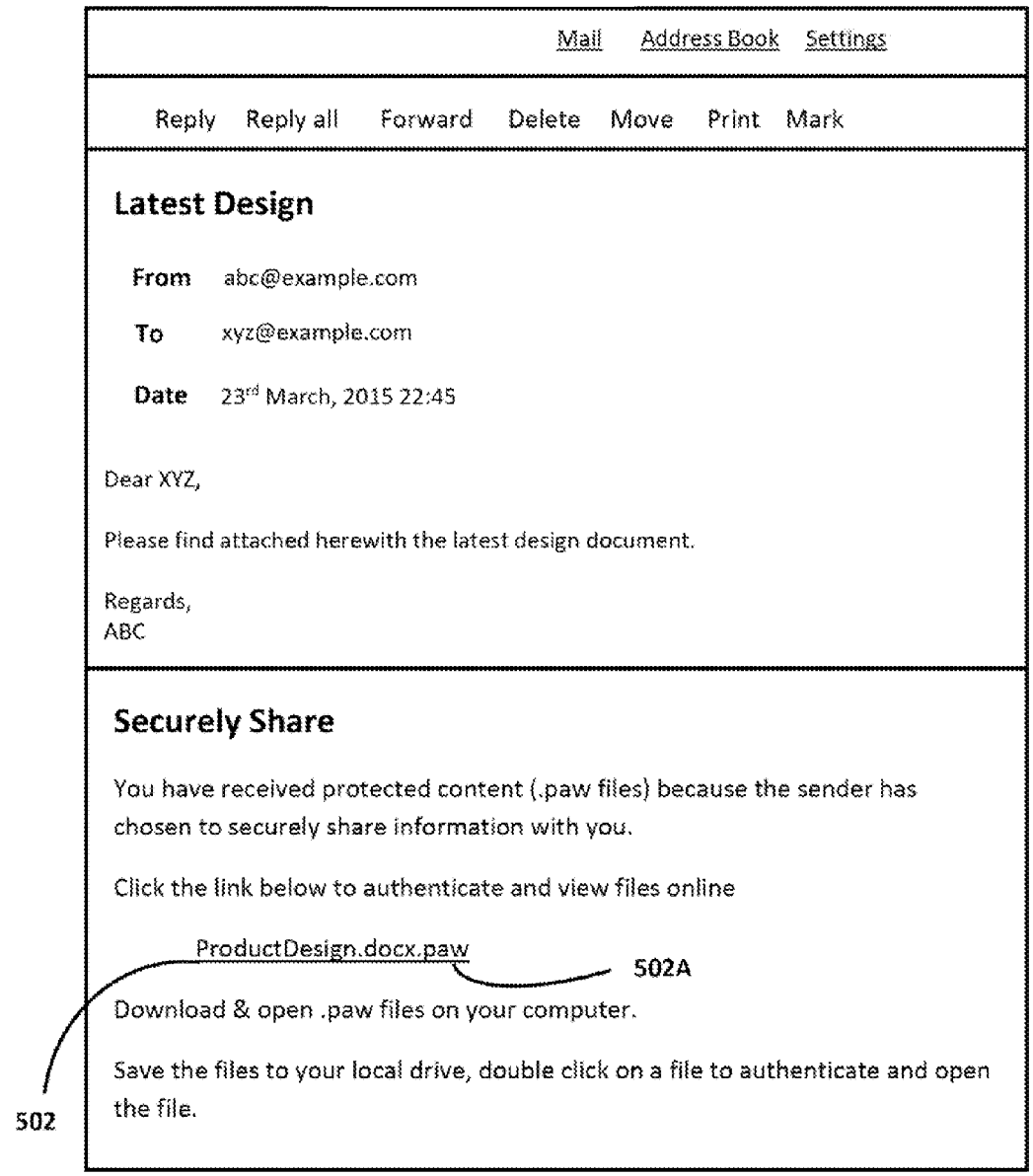
FIG. 5 is an exemplary screenshot representing a view of the user interface displaying a second link corresponding to at least one part of an email, in accordance with the present disclosure.

Further, the processing server 16 further includes a file manipulation engine denoted by 16B. The file manipulation engine 16B is configured to encapsulate the parts of the email into respective proprietary file wrappers (represented by reference numeral 502 in FIG. 5). The file wrappers encapsulating the respective parts of the email are governed by the access policy associated with the email. The file manipulation engine 16B creates the proprietary wrapper files for encapsulating the parts of the email in an encrypted format. The proprietary wrapper files carry a proprietary and uniform file extension ('.paw' extension as represented by reference numeral 502A in FIG. 5) regardless of the native file format of the email parts (for example the file type/extension associated with the email attachments).

In accordance with the present invention, the proprietary file wrapper is configured to enforce the access policy corresponding to the email and also to perform various configurable functionalities. The access policy, amongst multiple other records, is stored within the proprietary file wrapper, for example, within the file header of the file wrapper. The access policy is typically decided at the sender-side and populated in the file header of the file wrapper.

The proprietary file wrapper encapsulates the parts of the email, the file header, the access policy in an encrypted format. The term 'encapsulation' refers to the process of combining the pans of the email along with the corresponding metadata including email to header) in a predefined format with applicable layers of encryption, thereby creating the proprietary file wrapper.

Further, the file header of the file wrapper includes one or more encryption/decryption keys for single/multi-level encryption and decryption of the email and the parts thereof. The format of the file wrapper implies encryption of the content (email parts) encapsulated within the file wrapper. The file wrapper is typically assigned a customized file identifier, for example, a customized file icon that identifies the source or creator or owner of the email. The file wrapper supports icons independent of the file extension associated with the attachments of the email and independent of the application used to create the email. The header file of the file wrapper maintains a distribution list that includes the email addresses of the intended recipients. The email addresses of the email recipients are extracted from the 'To', 'Cc' and 'Bcc' sections of the email.

In accordance with the present invention, the link creator 16A is further configured to create at least one second link (represented by reference numeral 502 of FIG. 5), the number of second links typically depending upon the number of parts corresponding to an email, corresponding to each part of the email. For example, if the email comprises two attachments, at least two second links would be created by the link creator 16B, with each of the two links corresponding to the respective attachments exemplified in FIG. 5).

In accordance with the present invention, the link creator 16A further transmits the second links) to a recipient-end device 20 accessible to an intended recipient of the email. The recipient-end device is selected from the group of devices consisting of a desktop computer, a laptop computer, a personal digital assistant (PDA), a smart phone and a mobile phone. Subsequent to the intended recipient receiving and accessing the second link via the recipient-end device 20, the intended recipient, is redirected to a webpage that prompts the intended recipient to authenticate himself using an allowed authentication mechanism, preferably OTP.

At the same instance, the processing server 16 invokes a generator 16C configured to generate a one-time password (OTP) which acts as an authenticator for the intended recipient. The generator, in accordance with the present invention comprises a prompting module 161 configured to prompt the intended recipient to provide his email id. The prompting module 161 prompts the intended recipient for his email-id, so as to validate the email id of the intended recipient by comparing the same with the 'recipient email-id' provided by the sender of the email. The generator 16C comprises a comparator 162 configured to compare the email id provided by the intended recipient, with the 'recipient email-id' specified by the sender. Further, the generator 16c comprises a validation module 163 configured to validate the email id of the recipient, in the event that the email-id provided by the recipient via the prompting module 161 is same as the 'recipient email-id' specified by the email sender, in either 'To', 'Cc' or 'Bcc' column of the email.

In accordance with the present invention, the generator 16C further comprises a transmitter 164 configured to transmit the OTP to the OTP-end point device 18. The transmitter 164 transmits the OTP to the OTP end-point device 18 which is identified by the identifier (302B of FIG. 3) provided in the first code (exemplified in FIG. 3). In the event that the first code does not comprise an identifier identifying the OTP end-point to device, to which the OTP needs to be transmitted, the transmitter 164 transmits the OTP to the verified email-id corresponding to the intended recipient. The OTP end-point device 18 is selected from the group consisting of a validated email account, a mobile phone, a smart phone, a personal digital assistant, an OTP recipient device, and an electronic device implementing an OTP receiving application.

In accordance with the present invention, the processing server 16 provides the intended recipient access to the parts of the email in accordance with the access policy, only in the event that the intended recipient successfully reproduces the OTP previously transmitted by the transmitter 164 to the OTP-end point device 18, within a predetermined time limit. The processing server 16 is further configured to decrypt or cooperate in decrypting the encrypted parts of the email post successful authentication of the intended recipient Decryption of the parts of the email is typically performed by a desktop application executing on the recipient-end device 20. The decryption can also be implemented on a web application Cooperating with/being a part of the processing server 16. The intended recipient is allowed to access/edit the decrypted parts only if the access policy corresponding to the email provides read-write permissions to the intended recipient. Further, if the intended recipient is viewing the email via the web application, he is not allowed to download the decrypted parts (attachments) of the email, for the sake of data security. The processing server enables the intended recipient to access the decrypted parts. The processing server 16 is further configured to gather, store and provide activity logs corresponding to the email and parts thereof, wherein the activity logs comprise information corresponding to the activities performed upon the parts of the email at the server-end as well as the recipient-end.

Figure 2:
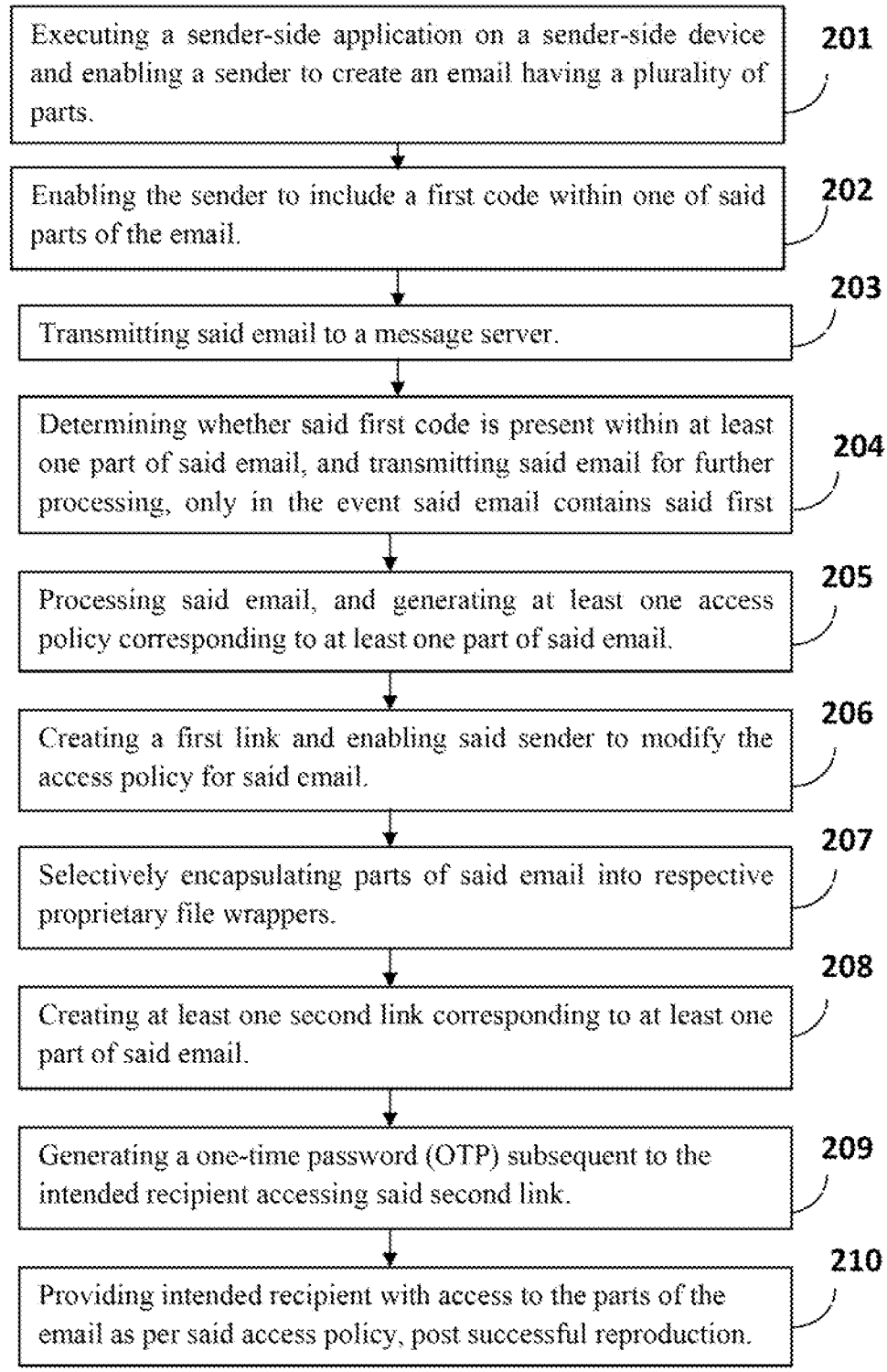
FIG. 2 is a flow chart illustrating the steps involved in the method for securing the data and information transmitted as email attachments.

Referring to FIG. 2 there is shown a flowchart illustrating the steps involved in the method (200) for securing the data and information transmitted via entails. The method, in accordance with the present disclosure comprises the following computer implemented steps: executing a sender-side application on a sender-side device and enabling a sender to create an email having a plurality of parts (201); enabling the sender to include a first code within one of the parts of the email, the first code comprising instructions for manipulating server-side processing of the email (202); transmitting the email to a message server (203); accessing the email using a filter module and determining whether the first code is present within at least one part of the email, and transmitting the entail for further processing, only in the event the email contains the first code (204); processing, the email in accordance with the instructions specified in the first code, and generating at least one access policy corresponding to at least one part of the email (205); creating a first link and enabling the sender to modify at least the access policy for the email by accessing the first link (206); selectively encapsulating parts of the email into respective proprietary file wrappers, each of the proprietary file wrappers having a proprietary file format and a proprietary file extension (207); creating at least one second link corresponding to at least one part of the email, and providing the intended recipient with restricted access to at least the part of the email, via the second link (208); generating a one-time password (OTP) subsequent to the intended recipient accessing the second link (209), the step of generating, the one-time password comprising the following steps: prompting the intended recipient for his-email id; comparing the email-id provided by the intended recipient with the recipient-id specified by the sender; successfully verifying the authenticity of the intended recipient in the event that the email-id provided by the intended recipient matches with the recipient email-id entered by the sender; transmitting the OTP, post successful validation of the email-id of the intended recipient, to at least one OTP end-point of the intended recipient, the OTP end-point identifiable from an identifier included in the first code; providing the intended recipient with access to the parts of the email as per the access policy, only in the event that the intended recipient successfully reproduces the OTP previously transmitted by the transmitter, within a predetermined time limit, thereby authenticating himself, (210).

In accordance with the present invention, the step (202) of enabling the sender to include a first code within one of the parts of the email, further includes the following steps: enabling, the sender to include a first code comprising instructions for assigning access permissions to the attachments of the email; enabling the sender to include a first code comprising instructions for modifying the time validity of the parts of the email; and enabling the sender to include first code comprising instructions for tracking the processing of the email and attachments thereof at the recipient side.

In accordance with the present invention, the step (205) of processing the email in accordance with the instructions specified in the first code, further includes the steps of: processing the email in accordance with instructions for assigning access permissions to the attachments of the email; processing the email in accordance with instructions for modifying the validity of the email and attachments thereof; and processing the email in accordance with instructions for tracking the processing of the email and attachments thereof at the recipient side.

In accordance with the present invention, the method further includes the step of transmitting, the first link to the email-id associated with the sender of the email and transmitting the second link to the email-id of the intended recipient.

In accordance with the present invention, the step 205 of processing the email in accordance with the instructions specified in the first code further includes the step of making the activity logs accessible to the email sender through the first link.

In accordance with the present invention, the step (205) of generating at least one access policy corresponding to at least one part of the email further includes the following steps: enabling the sender of the email to modify the email recipients having access to the encapsulated parts of the email; enabling the sender to modify the access permissions corresponding to the parts of the email; enabling the sender to modify the validity period associated with the encapsulated email parts.

TECHNICAL ADVANTAGES

The present invention envisages a computer implemented system and method for securing the data and information transmitted in the form of email attachments. The system envisaged by the present invention ensures that no unauthorized user accesses the data and information linked to an email in the form of main content or attachments. The system envisaged by the present invention does not involve utilization and transferring of cryptographic keys for the purpose of securing the email attachments. The present invention offers an alternative to the existing encryption system/methods which are the only available mode of securing email attachments. The present invention envisages a system that processes the email message and the attachments thereof and encrypts the same prior to authenticating the intended recipient for genuineness.

The system envisaged by the present invention obviates the use of third party key managers and key distribution centers by encapsulating the individual email attachments into file wrappers. The system makes a decrypted version of the file wrapper available to the intended recipient only after the intended recipient authenticates himself by the way of an OTP, thereby providing for secured transmission of the email attachments to the intended recipient.

I claim:

1. A computer implemented system for securing data and information transmitted via emails, said system comprising:
   a sender-side device executing a sender-side application configured to enable a sender to create an email having a plurality of parts, said sender-side application configured to enable the sender to include a first code within one of said parts of the email, said first code comprising instructions for manipulating server-side processing of said email, said first code further comprising instructions for at least assigning access permissions to said parts of the email, specifying valid recipients of said parts, time validity of said parts, said sender-side device configured to transmit said email to a message server;
   a filter module cooperating with said message server to access said email and determine whether said first code is present within at least one part of said email, said filter module further configured to transmit said email for further processing, only in an event said email contains said first code;
   a processing server cooperating with said filter module to receive and process said email in accordance with the instructions specified in said first code, said processing server configured to generate at least one access policy corresponding to at least one part of said email, said processing server comprising:
   a link creator configured to create a first link accessible to the sender of said email, said first link configured to enable said sender to access and modify the access policy for said email, said link creator further configured to create at least one second link corresponding to at least one part of said email, said second link configured to provide an intended recipient with restricted access to at least said one part of the email;
   a file manipulation engine configured to selectively encapsulate parts of said email into respective proprietary file wrappers, each of said proprietary file wrappers having a proprietary file format and a proprietary file extension;
   a generator configured to generate a one-time password (OTP) subsequent to the intended recipient accessing said second link, said generator comprising:
   a prompting module configured to prompt the intended recipient for an email-ID;
   a comparator configured to compare the email-ID provided by the intended recipient with recipient email-IDs specified by the sender;

a validation module configured to successfully validate the intended recipient in an event that the email-ID of provided by the intended recipient matches with one of the recipient email-IDs specified by the sender; and a transmitter configured to transmit said OTP to an OTP end-point of the intended recipient, subsequent to successful validation of the email-ID provided by the intended recipient, said OTP end-point identifiable from an identifier included in said first code;

said processing server further configured to provide the intended recipient with access to said parts of the email in accordance with said access policy, only in an event that the intended recipient successfully reproduces the OTP previously transmitted by said transmitter, within a predetermined time limit, said OTP authenticating the intended recipient.

2. The computer implemented system as claimed in claim 1, wherein said system comprises a recipient-side device accessible to the intended recipient of said email, said recipient-side device configured to receive said second link transmitted by said link creator.

3. The computer-implemented system as claimed in claim 1, wherein said OTP end-point is selected from a group consisting of a validated email account, a mobile phone, a smart phone, a personal digital assistant, an OTP recipient device, and an electronic device implementing an OTP receiving application.

4. The computer implemented system as claimed in claim 1, wherein said first code comprises at least one tag entry and at least one keyword, said tag and keyword comprising at least one character from Unicode character set.

5. The computer implemented system as claimed in claim 1, wherein said first code further comprises an email address corresponding to an intended recipient and an identifier identifying the OTP end-point.

6. The computer implemented system as claimed in claim 1, wherein the plurality of parts of said email include email headers, email body, inline parts and email attachment(s).

7. The system as claimed in claim 1, wherein said link creator is configured to create a plurality of second links, each of the plurality of second links corresponding to the respective file wrappers, said file wrappers corresponding to respective parts of said email.

8. The system as claimed in claim 1, wherein said processing server is further configured to gather, store and provide activity logs corresponding to said email, said activity logs comprising information corresponding to the activities performed upon the proprietary file wrappers, said activity logs accessible to the sender through said first link.

9. The system as claimed in claim 1, wherein said first code further comprises instructions selected from a group consisting of instructions for encapsulating parts of said email into proprietary wrapper files, and instructions for authenticating intended recipients of the encapsulated parts.

10. The system as claimed in claim 1, wherein said file manipulation engine is further configured to encrypt parts of said email while encapsulating the parts of the email into respective file wrappers.

11. The system as claimed in claim 1, wherein said processing server is configured to generate a plurality of access policies, each of the plurality of access policies corresponding to respective parts of said email, each of said access policies having a plurality of attributes including allowed recipient address and access permissions thereof, and validity period of the email and attachments thereof.

12. The system as claimed in claim 1 or 8, wherein the link creator is further configured to enable said sender to modify email recipient addresses allowed to unwrap and use encapsulated parts of said email, said link creator further configured to enable said sender to modify the access permissions corresponding to the email, said link creator still further configured to enable said sender to modify the validity period associated with the email parts and to view the activity logs associated with the proprietary file wrappers.

13. A computer implemented method for securing data and information transmitted via emails, said method comprising the following computer implemented steps:

executing a sender-side application on a sender-side device and enabling a sender to create an email having a plurality of parts;

enabling the sender to include a first code within one of said parts of the email, said first code comprising instructions for manipulating server-side processing of said email, said first code further comprising instructions for at least assigning access permissions to said parts of the email, specifying valid recipients of said parts, time validity of said parts:

transmitting said email to a message server;

accessing said email using a filter module and determining whether said first code is present within at least one part of said email, and transmitting said email for further processing, only in an event said email contains said first code;

processing said email in accordance with the instructions specified in said first code, and generating at least one access policy corresponding to at least one part of said email;

creating a first link and enabling said sender to modify at least the access policy for said email by accessing said first link;

selectively encapsulating parts of said email into respective proprietary file wrappers, each of said proprietary file wrappers having a proprietary file format and a proprietary file extension;

creating at least one second link corresponding to at least one part of said email, and providing an intended recipient with restricted access to at least said one part of the email, via said second link;

generating a one-time password (OTP) subsequent to the intended recipient accessing said second link, the step of generating the one-time password comprising the following steps:

prompting the intended recipient for an email-ID;

comparing the email-ID provided by the intended recipient with recipient email-IDs specified by the sender;

successfully verifying the authenticity of the intended recipient in an event that the email-ID provided by the intended recipient matches with one of the recipient email-IDs specified by the sender;

transmitting said OTP, post successful validation of the email-ID of the intended recipient, to at least one OTP end-point of the intended recipient, said OTP end-point identifiable from an identifier included in said first code;

providing the intended recipient with access to the parts of the email as per said access policy, only in an event that the intended recipient successfully reproduces the OTP previously transmitted by said transmitter, within a predetermined time limit.

14. The method as claimed in claim 13, wherein the step of processing said email in accordance with the instructions specified in said first code, further includes the steps of:

processing said email in accordance with instructions for assigning access permissions to the attachments of said email;

processing said email in accordance with instructions for modifying the validity of the email and attachments thereof; and processing said email in accordance with instructions for tracking activities performed by the intended recipient on said email and attachments thereof.

15. The method as claimed in claim 13, wherein the method further includes the step of transmitting said first link to an email-ID associated with the sender of the email and transmitting said second link to the email-ID of the intended recipient.

16. The method as claimed in claim 13, wherein the step of processing said email in accordance with the instructions specified in said first code further includes the step of making a plurality of activity logs accessible to the email sender through said first link, said activity logs comprising information corresponding to the activities performed upon the proprietary file wrappers.

17. The method as claimed in claim 13, wherein the step of generating at least one access policy corresponding to at least one part of said email further includes the following steps:

enabling said sender to modify the email recipients having access to the encapsulated parts of the email;

enabling said sender to modify the access permissions corresponding to the parts of said email; and enabling said sender to modify the validity period associated with the parts of said email.

* * * * *